(12) United States Patent
Choi et al.

(10) Patent No.: US 12,099,670 B2
(45) Date of Patent: Sep. 24, 2024

(54) ANTENNA-INSERTED ELECTRODE STRUCTURE AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Dong Pil Park, Incheon (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 18/104,445

(22) Filed: Feb. 1, 2023

(65) Prior Publication Data
US 2023/0176673 A1 Jun. 8, 2023

Related U.S. Application Data

(63) Continuation of application No. PCT/KR2021/010585, filed on Aug. 10, 2021.

(30) Foreign Application Priority Data

Aug. 11, 2020 (KR) .................. 10-2020-0100222

(51) Int. Cl.
*G06F 3/041* (2006.01)
*G06F 3/044* (2006.01)
*H01Q 1/22* (2006.01)

(52) U.S. Cl.
CPC .......... *G06F 3/0412* (2013.01); *G06F 3/0443* (2019.05); *G06F 3/0446* (2019.05); *H01Q 1/2266* (2013.01); *G06F 2203/04112* (2013.01)

(58) Field of Classification Search
CPC ...... G06F 3/0443; G06F 3/0445; G06F 3/041; G06F 3/0412; G06F 3/0446;
(Continued)

(56) References Cited

U.S. PATENT DOCUMENTS

2011/0273382 A1* 11/2011 Yoo .......................... G06F 3/041
345/173
2015/0185928 A1* 7/2015 Son ........................ G06F 3/0445
345/174
(Continued)

FOREIGN PATENT DOCUMENTS

KR  10-2013-0095451 A   8/2013
KR  10-2016-0080444 A   7/2016
(Continued)

OTHER PUBLICATIONS

International Search Report for PCT/KR2021/010585 mailed on Nov. 25, 2021.

*Primary Examiner* — Nitin Patel
*Assistant Examiner* — Amen W Bogale
(74) *Attorney, Agent, or Firm* — The PL Law Group, PLLC

(57) ABSTRACT

An antenna-inserted electrode structure according to an embodiment includes a substrate layer having a touch sensing region and an antenna-touch sensing region, first sensing electrodes arranged on the touch sensing region of the substrate layer, second sensing electrodes arranged on the antenna-touch sensing region of the substrate layer, and an antenna unit spaced apart from the second sensing electrodes on the antenna-touch sensing region of the substrate layer. The antenna unit and the second sensing electrodes include a conductive material having a lower resistance than that of the first sensing electrodes.

15 Claims, 5 Drawing Sheets

(58) Field of Classification Search
CPC .... G06F 3/0448; G06F 3/04164; G06F 3/047;
G06F 1/1698; G06F 2203/04112; G06F
2203/04111; H01Q 21/08; H01Q 21/065;
H01Q 21/061; H01Q 1/2266; H01Q 1/44;
H01Q 1/36; H01Q 1/38; H01Q 1/52;
H01Q 9/04; H01Q 9/0407; H01Q 9/045;
H01Q 5/307; H01Q 1/243
See application file for complete search history.

(56) References Cited

U.S. PATENT DOCUMENTS

| | | | |
|---|---|---|---|
| 2016/0195983 A1* | 7/2016 | Miyake | G06F 3/0412 |
| | | | 345/174 |
| 2017/0031514 A1* | 2/2017 | Kimura | G02F 1/13338 |
| 2020/0227819 A1* | 7/2020 | Oh | H04M 1/0266 |
| 2020/0319735 A1* | 10/2020 | Kim | G06F 3/0418 |
| 2021/0200379 A1* | 7/2021 | Youk | G06F 3/0443 |
| 2021/0358996 A1* | 11/2021 | Lee | H10K 59/00 |

FOREIGN PATENT DOCUMENTS

| | | |
|---|---|---|
| KR | 10-2016-0131152 A | 11/2016 |
| KR | 10-1718016 B1 | 3/2017 |
| KR | 10-2019-0090226 A | 8/2019 |
| KR | 10-2020-0039311 A | 4/2020 |
| KR | 10-2020-0038797 A | 4/2020 |
| WO | WO 2013/063176 A1 | 5/2013 |

* cited by examiner

ANTENNA-INSERTED ELECTRODE STRUCTURE AND IMAGE DISPLAY DEVICE INCLUDING THE SAME

CROSS-REFERENCE TO RELATED APPLICATION AND CLAIM OF PRIORITY

The present application is a continuation application to International Application No. PCT/KR2021/010585 with an International Filing Date of Aug. 10, 2021, which claims the benefit of Korean Patent Applications No. 10-2020-0100222 filed on Aug. 11, 2020 at the Korean Intellectual Property Office (KIPO), the disclosures of which are incorporated by reference herein in their entirety.

BACKGROUND

1. Field

The present invention relates to an antenna-inserted electrode structure and a display device including the same. More particularly, the present invention relates to an antenna-inserted electrode structure including an antenna unit and a sensing electrode and an image display device including the same.

2. Description of the Related Art

Recently, electronic devices capable of inputting a user's direction by selecting an instruction displayed on an image display device with a human hand or an object are implemented by a combination of the image display device and a touch sensor as various shapes such as a smart phones, a tablet PC, etc.

Further, the image display device is being combined with a communication device such as a smart phone. For example, an antenna for implementing high-frequency or ultra-high frequency communication may be applied to the image display device.

As described above, when the touch sensor and the antenna are included in one image display device, a design construction for inserting a plurality of electrodes in a limited space is required. Further, when the electrodes are arranged in a display area of the image display device, a reduction of transmittance and deterioration of image quality may be caused.

The high-frequency or ultra-high frequency antenna may be weak to a signal loss, and if the antenna is formed using the same design and material as those of the sensing electrode of the touch sensor, sufficient antenna radiation properties may not be realized.

Therefore, an electrode construction to improve touch sensitivity and radiation properties while considering improvement of image properties in the display area is needed.

For example, as disclosed in Korean Published Patent Application No. 2014-0092366, a touch screen panel in which a touch sensor is combined with various image display devices has been recently developed. Korean Patent Publication No. 2013-0095451 discloses an antenna integrated into a display panel. However, an image display device in which an antenna and a touch sensor are efficiently disposed together is not disclosed.

SUMMARY

According to an aspect of the present invention, there is provided an antenna-inserted electrode structure having improved electrical and optical properties.

According to an aspect of the present invention, there is provided an image display device including an antenna-inserted electrode structure with improved electrical and optical properties.

The above aspects of the present invention will be achieved by one or more of the following features or constructions:

(1) An antenna-inserted electrode structure, including: a substrate layer having a touch sensing region and an antenna-touch sensing region; first sensing electrodes arranged on the touch sensing region of the substrate layer; second sensing electrodes arranged on the antenna-touch sensing region of the substrate layer; and an antenna unit spaced apart from the second sensing electrodes on the antenna-touch sensing region of the substrate layer, wherein the antenna unit and the second sensing electrodes include a conductive material having a lower resistance than that of the first sensing electrodes.

(2) The antenna-inserted electrode structure of the above (1), wherein the first sensing electrodes include a transparent conductive oxide.

(3) The antenna-inserted electrode structure of the above (2), wherein the second sensing electrodes and the antenna unit have a mesh structure formed of a metal or an alloy.

(4) The antenna-inserted electrode structure of the above (3), further including a dummy mesh electrode disposed between the second sensing electrodes and the antenna unit to be separated from the second sensing electrodes and the antenna unit.

(5) The antenna-inserted electrode structure of the above (2), wherein the second sensing electrodes and the antenna unit include a metal nanowire or a conductive polymer.

(6) The antenna-inserted electrode structure of the above (2), wherein the second sensing electrodes and the antenna unit have a multi-layered structure of a transparent conductive oxide layer and a metal layer.

(7) The antenna-inserted electrode structure of the above (1), wherein the first sensing electrodes include first row sensing electrodes and first column sensing electrodes, and the second sensing electrodes include second row sensing electrodes and second column sensing electrodes.

(8) The antenna-inserted electrode structure of the above (7), further including: a first bridge electrode electrically connecting first row sensing electrodes neighboring in a row direction of the first row sensing electrodes on the touch sensing region; and a first connector connecting first column sensing electrodes neighboring in a column direction of the first column sensing electrodes on the touch sensing region.

(9) The antenna-inserted electrode structure of the above (8), further including: an intermediate electrode disposed around the antenna unit on the antenna-touch sensing region to electrically connect second row sensing electrodes neighboring in the row direction of the second row sensing electrodes; and a second connector disposed around the antenna unit on the antenna-touch sensing region to connect second column sensing electrodes neighboring in the column direction of the second column sensing electrodes.

(10) The antenna-inserted electrode structure of the above (9), further including a second bridge electrode connecting the intermediate electrode and the second row sensing electrodes neighboring in the row direction on the antenna-touch sensing region, wherein the intermediate electrode is disposed to be separated from the second row sensing electrodes.

(11) The antenna-inserted electrode structure of the above (9), wherein the second connector has a shape different from that of the first connector.

(12) The antenna-inserted electrode structure of the above (7), wherein the first row sensing electrodes are connected to each other in a row direction to form first sensing electrode rows spaced apart from each other along a column direction on the touch sensing region, and the second row sensing electrodes are connected to each other in the row direction to form a second sensing electrode row on the antenna-touch sensing region.

(13) The antenna-inserted electrode structure of the above (12), wherein the antenna unit overlaps the second sensing electrode row in the row direction on the same plane.

(14) The antenna-inserted electrode structure of the above (12), wherein the first column sensing electrodes are connected to each other in the column direction to form first sensing electrode columns spaced apart from each other along the row direction on the touch sensing region, and the second column sensing electrodes are connected to the first sensing electrode columns.

(15) The antenna-inserted electrode structure of the above (1), wherein the antenna unit and the second sensing electrodes include the same conductive material.

(16) An image display device including the antenna-inserted electrode structure according to exemplary embodiments as described above.

In an antenna-inserted electrode structure according to exemplary embodiments of the present invention, first sensing electrodes arranged in a touch sensing region and electrodes (an antenna unit and second sensing electrodes) arranged in an antenna-touch sensing region may be formed of different conductive materials. For example, the antenna unit and the second sensing electrodes may be formed of a conductive material having a lower resistance than that of the first sensing electrodes, and the first sensing electrodes may be formed of a conductive material having relatively a high transmittance.

Accordingly, a moire phenomenon may be prevented while improving transmittance in the touch sensing region, and sufficient antenna radiation properties at a high frequency or ultra-high frequency band may be achieved in the antenna-touch sensing region.

In some embodiments, the second sensing electrodes disposed in the antenna-touch sensing region may be connected to each other through an intermediate electrode or a connector formed along a periphery of the antenna unit. Accordingly, desired touch sensitivity may be maintained while maintaining a channel continuity even when the antenna unit is inserted.

DETAILED DESCRIPTION OF THE EMBODIMENTS

According to exemplary embodiments of the present invention, there is provided an antenna-inserted electrode structure including an antenna unit and a sensing electrode which may be arranged on the same plane and may include different materials. Further, there is provided an image display device including the antenna-inserted electrode structure.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "column direction" and "row direction" used herein do not refer to an absolute direction, but are used to relatively refer to two different directions.

Figure 1:
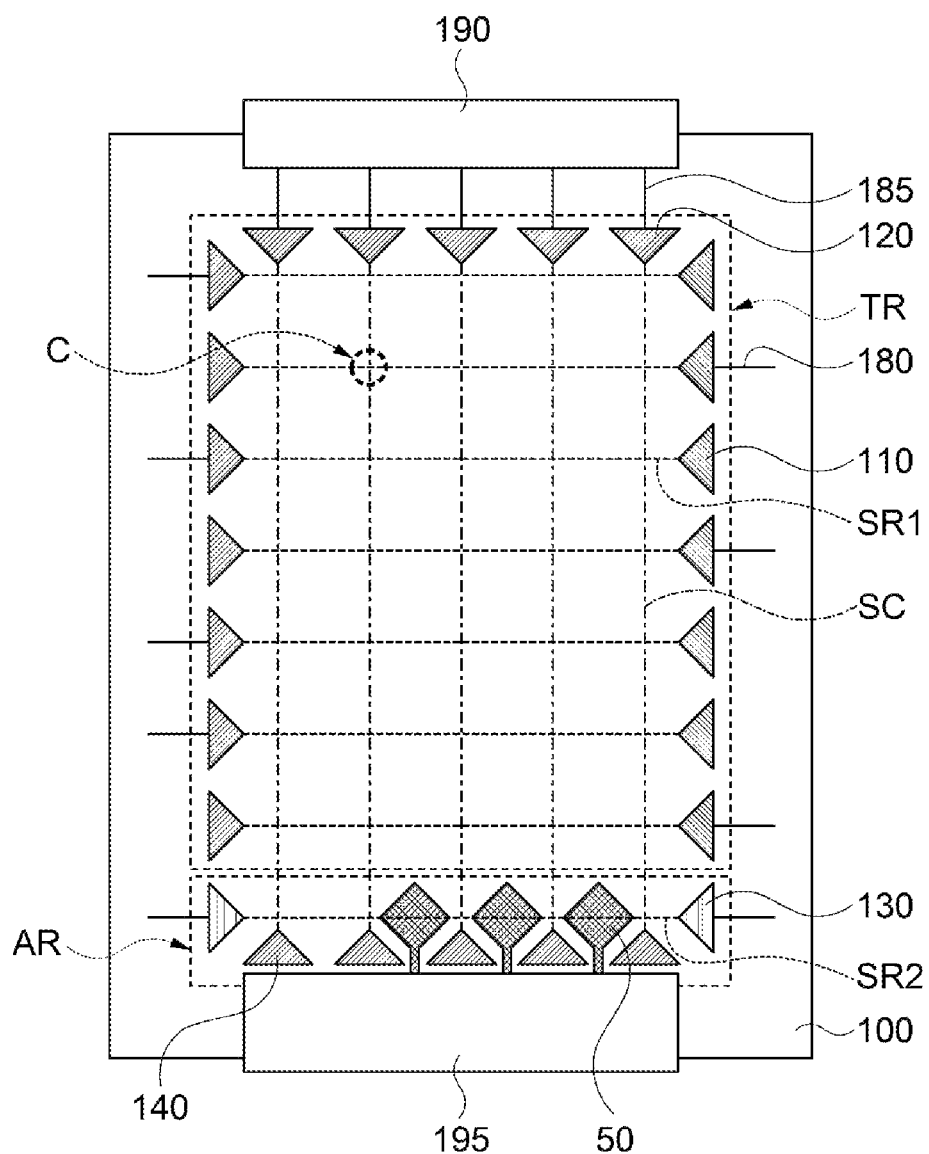
FIG. 1 is a schematic top planar view illustrating an antenna-inserted electrode structure in accordance with exemplary embodiments.
Figure 2:
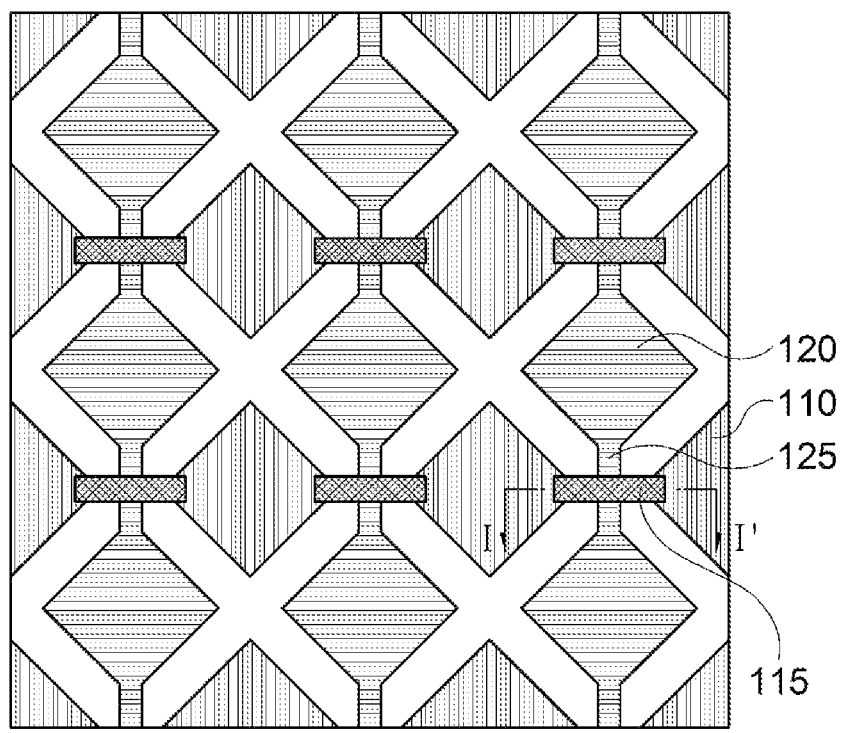
FIGS. 2 and 3 are a schematic top planar view and a schematic cross-sectional view, respectively, illustrating a construction of sensing electrodes in an antenna-inserted electrode structure in accordance with exemplary embodiments.
Figure 3:
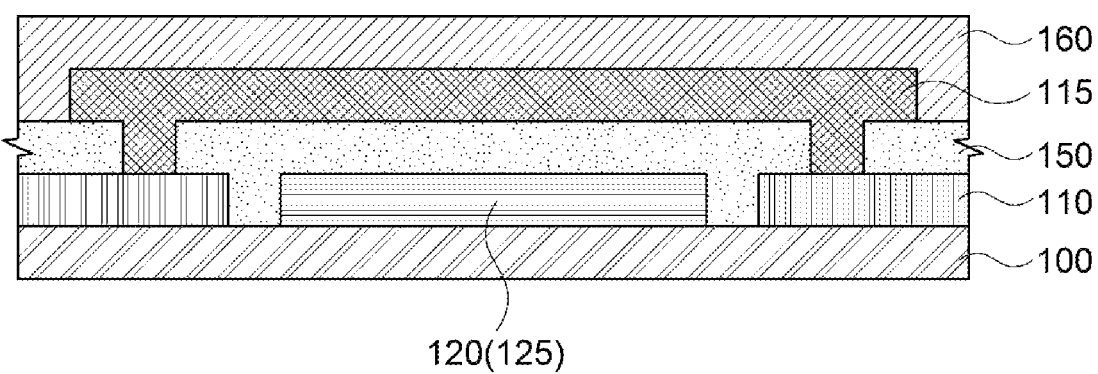

FIG. 1 is a schematic top planar view illustrating an antenna-inserted electrode structure in accordance with exemplary embodiments. FIGS. 2 and 3 are a schematic top planar view and a schematic cross-sectional view, respectively, illustrating a construction of sensing electrodes in an antenna-inserted electrode structure in accordance with exemplary embodiments.

Specifically, FIG. 2 is a partially enlarged top planar view illustrating an arrangement of sensing electrodes in a touch sensing region TR. FIG. 3 is a cross-sectional view taken along a line I-I' of FIG. 2 in a thickness direction. For example, FIG. 3 is a cross-sectional view at an intersection region C of a sensing electrode row and a sensing electrode column indicated in FIG. 1.

Referring to FIGS. 1 to 3, an antenna-inserted electrode structure may include a substrate layer 100 on which a sensing electrode and an antenna unit are arranged.

The substrate layer 100 or the antenna-inserted electrode structure may include a touch sensing region TR and an antenna-touch sensing region AR.

The touch sensing region TR may include a central portion of the substrate layer 100 and may substantially serve as an active area of a touch sensor through which a user's touch input is substantially sensed. In exemplary embodiments, the active region AR may substantially correspond to a display area of an image display device. The antenna-touch sensing region AR may be disposed adjacent to one end portion of the touch sensing region TR.

The antenna-touch sensing region TR may be, e.g., an area in which the antenna unit 50 for implementing high-frequency or ultra-high frequency (e.g., 3G, 4G, 5G or more) mobile communication is disposed. In exemplary embodiments, some of the sensing electrodes of a touch sensor may be distributed together with the antenna unit 50 in the antenna-touch sensing region AR.

Figure 5:
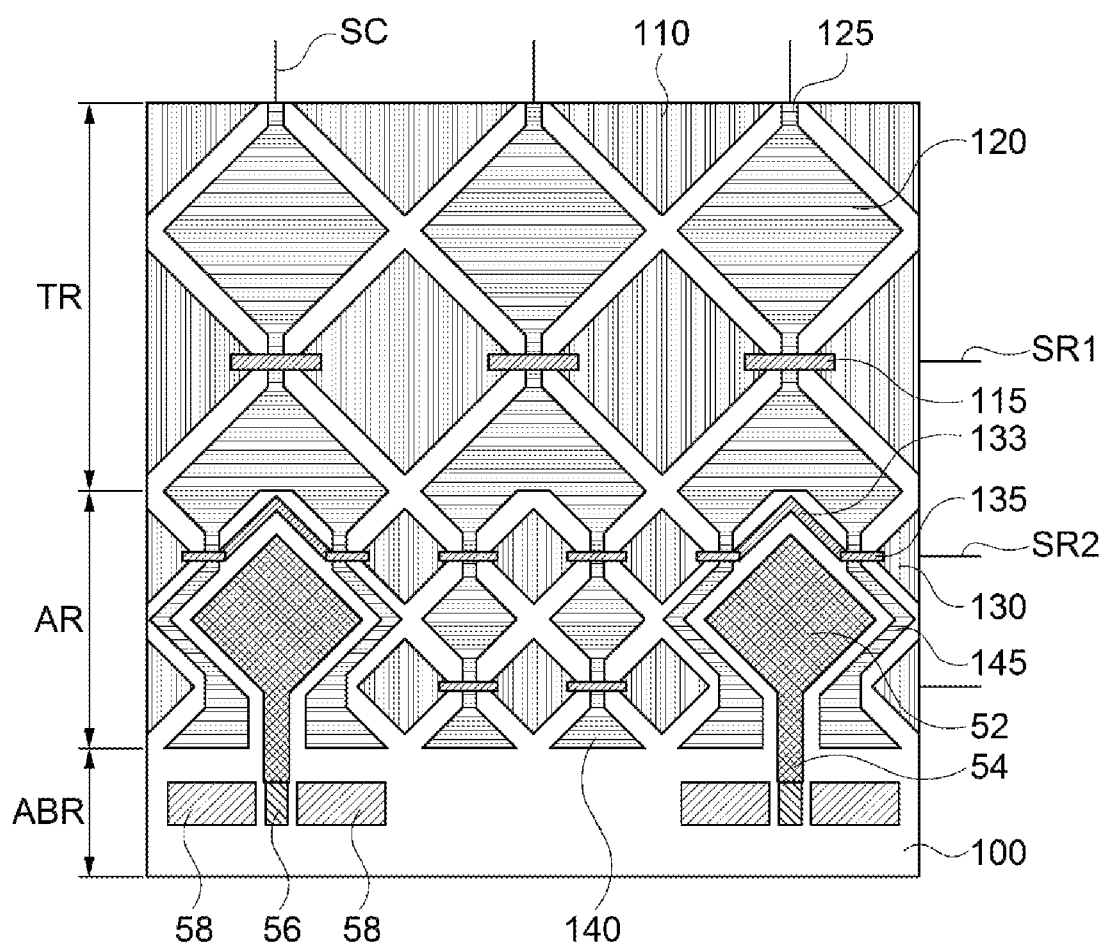
FIG. 5 is a partially enlarged top planar view illustrating arrangements of electrodes and patterns in an antenna-inserted electrode structure in accordance with some exemplary embodiments

In an embodiment, as illustrated in FIG. 5, the antenna unit 50 and the sensing electrodes (second sensing electrodes) may be distributed throughout the entire antenna-touch sensing region AR. In an embodiment, an area in which the antenna unit 50 is arranged and an area in which the second sensing electrodes are arranged in the antenna-touch sensing region AR may be divided in a column direction or a row direction.

The substrate layer 100 may include a support layer or a film type substrate for forming the sensing electrodes and the antenna unit. For example, the substrate layer 100 may include a film material commonly used for a touch sensor without particular limitation, and may include, e.g., glass, a polymer, and/or an inorganic insulating material.

Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride, a metal oxide, etc.

In some embodiments, a layer or film member of an image display device to which the antenna-inserted electrode structure is applied may serve as the substrate layer 100. For example, an encapsulation layer or a passivation layer included in a display panel may serve as the substrate layer 100.

The sensing electrodes may be arranged to be operable in a mutual capacitance type. The sensing electrodes may include first row sensing electrodes 110 and first column sensing electrodes 120 arranged on the touch sensing region TR. The sensing electrodes may further include second row sensing electrodes 130 and second column sensing electrodes 140 arranged on the antenna-touch sensing region AR.

The antenna unit 50 may be disposed to be electrically and physically isolated from or separated from the second row sensing electrodes 130 and the second column sensing electrodes 140 on the antenna-touch sensing region AR. For example, the plurality of antenna units 50 may be disposed in spaces between the second row sensing electrodes 130 and the second column sensing electrodes 140.

The first row sensing electrodes 110 and the second row sensing electrodes 130 may be arranged along the row direction, and may each have an independent island pattern shape. The first row sensing electrodes 110 neighboring each other in the row direction may be electrically connected to each other by a first bridge electrode 115. The second row sensing electrodes 130 neighboring each other in the row direction may be electrically connected to each other by a second bridge electrode 135 (see FIG. 5).

Accordingly, the row sensing electrodes arranged in the row direction may be connected to form a sensing electrode row extending in the row direction, and a plurality of the sensing electrode rows may be arranged along the column direction.

In exemplary embodiments, at least one sensing electrode row among the plurality of sensing electrode rows may be disposed together with the antenna unit 50 on the antenna-touch sensing region AR. Accordingly, the antenna unit 50 may overlap at least one sensing electrode row at the same plane in the row direction.

In some embodiments, a sensing electrode row disposed at a bottom among the sensing electrode rows in a planar view (in a view of FIG. 1) may be disposed together with the antenna unit 50 on the antenna-touch sensing region AR.

The sensing electrode rows may include first sensing electrode rows SR1 arranged on the touch sensing region TR and second sensing electrode rows SR2 arranged on the antenna-touch sensing region AR.

The first column sensing electrodes 120 and the second column sensing electrodes 140 may be arranged along the column direction. The first column sensing electrodes 120 may be connected to each other by a first connector 125. The first column sensing electrodes 120 and the first connector 125 may be integrally connected to each other to be provided as a substantially single member. The second column sensing electrodes 140 may be connected to each other by a second connector 145 (see FIG. 5). The second column sensing electrodes 140 and the second connector 145 may be integrally connected to each other to be provided as a substantially single member.

For example, the first column sensing electrodes 120 and the second column sensing electrodes 140 may be connected together in the column direction by the first connector 125 and the second connector 145. Accordingly, a sensing electrode column extending in the column direction throughout the touch sensing region TR and the antenna-touch sensing region AR may be defined. A plurality of the sensing electrode columns may be arranged along the row direction.

The above-described sensing electrodes and the antenna unit 50 may be located at the same layer or at the same level.

As illustrated in FIG. 3, an insulating layer 150 covering the antenna unit and the sensing electrodes may be formed on a top surface of the substrate layer 100. The bridge electrodes 115 and 135 may be formed on the insulating layer 150. The bridge electrodes 115 and 135 may be formed through the insulating layer 150 to electrically connect the neighboring row sensing electrodes 110 and 130 to each other.

A protective layer 160 may be formed on the insulating layer 150 to cover the bridge electrodes 115 and 135. The insulating layer 150 and the protective layer 160 may include an inorganic insulating material such as silicon oxide or silicon nitride, or an organic insulating material such as an acrylic resin or a siloxane-based resin.

As illustrated in FIGS. 1 and 2, each of the sensing electrodes may have a rhombus shape or a diamond shape. However, the shape of the sensing electrodes may be appropriately changed in consideration of optical properties to prevent moire and a visual recognition of the electrodes. For example, boundaries of the sensing electrodes may have a wavy shape.

In exemplary embodiments, the first row sensing electrodes 110 and the first column sensing electrodes 120 disposed in the touch sensing region TR may include a conductive material different from that of the antenna unit 50 arranged in the antenna-touch sensing region AR.

In exemplary embodiments, the first row sensing electrodes 110 and the first column sensing electrodes 120 may include a transparent conductive oxide such as indium tin oxide (ITO), indium zinc oxide (IZO), zinc oxide (ZnO), indium zinc tin oxide (IZTO), cadmium tin oxide (CTO), or the like.

In some embodiments, the first row sensing electrodes 110 and the first column sensing electrodes 120 may be a solid pattern formed of the transparent conductive oxide. Thus, a sufficient charge flow area may be provided while using the transparent conductive oxide having the relatively high resistance compared to that of a metal or an alloy.

Further, a sufficient transmittance may be obtained on the touch sensing region TR substantially wholly overlapping a display region, and a moire phenomenon with a circuit structure included in a display panel may be suppressed.

In an embodiment, the first row sensing electrodes 110 and the first column sensing electrodes 120 may substantially consist of the transparent conductive oxide, and may not include other conductive materials. In an embodiment, the first row sensing electrodes 110 and the first column sensing electrodes 120 may have a single-layered structure formed of the transparent conductive oxide.

The antenna unit 50 may include a material having a lower resistance (e.g., a sheet resistance) than that of the first row sensing electrodes 110 and the first column sensing electrodes 120. Accordingly, sufficient radiation properties may be achieved while reducing a signal resistance of the antenna unit 50 formed in a relatively small area at one end portion of the substrate layer 100.

In some embodiments, the antenna unit 50 may have a mesh structure formed of a metal or an alloy. For example, the antenna unit 50 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one of the metals. These may be used alone or in a combination of two or more therefrom.

In an embodiment, the antenna unit 50 may include silver or a silver-containing alloy (e.g., silver-palladium-copper (APC)), or copper or a copper-containing alloy (e.g., copper-calcium (CuCa)) to implement a low resistance and a fine line width.

In an embodiment, the antenna unit 50 may include a metal nanowire (e.g., a silver nanowire).

In an embodiment, the antenna unit 50 may include a conductive polymer having a lower resistance than that of the transparent conductive oxide. For example, the antenna unit 50 may include PEDOT:PSS (poly(3,4-ethylenedioxythiophene):poly(styrenesulfonate)).

In an embodiment, the antenna unit 50 may have a multi-layered structure including a metal layer. For example, the antenna unit 50 may have a multi-layered structure of a transparent conductive oxide layer-the metal layer, or a multi-layered structure of a first transparent conductive oxide layer-the metal layer-a second transparent conductive oxide layer sequentially stacked.

In this case, flexible properties may be improved by the metal layer, and a resistance may also be reduced by the metal layer to increase a signal transmission speed. Anti-corrosive and transparent properties may be improved by the transparent conductive oxide layer.

The second row sensing electrodes 130 and the second column sensing electrodes 140 disposed in the antenna-touch sensing region AR may include the same conductive material as that of the antenna unit 50 as described above. For example, the second row sensing electrodes 130 and the second column sensing electrodes 140 may include a multi-layered structure of the metal/alloy, the metal nanowire, the low-resistance conductive polymer, or the metal layer/transparent conductive oxide layer.

Accordingly, the second row sensing electrodes 130 and the second column sensing electrodes 140 may be formed by the same film forming process and etching process as those for the antenna unit 50. Further, for example, the touch sensing sensitivity in an end region of the image display device having a relatively small area may be efficiently improved.

As described above, a user's touch input may be easily transmitted throughout a wide area in the touch sensing region TR, so that sufficient touch sensing may be implemented even though a relatively high sheet resistance material may be used. Accordingly, in the touch sensing region TR, the electrodes may be formed using the transparent conductive oxide having a relatively high transmittance, so that sufficient transmittance in the image display device may be provided.

In the antenna-touch sensing region AR having a relatively small area, the electrodes formed of the above-described low-resistance material may be arranged to achieve sufficient antenna gain, radiation properties and touch sensing. Further, the electrodes having a mesh structure may be arranged in consideration of transmittance in the antenna-touch sensing region AR.

Referring again to FIG. 1, a row trace 180 and a column trace 185 may extend from terminal end portions of the above-described sensing electrode row and sensing electrode column, respectively. The traces 180 and 185 may extend on a peripheral area of the touch sensor region TR to a touch sensor bonding region (e.g., a region under a touch sensor driving integrated circuit (IC) chip 190 illustrated in FIG. 1) allocated on an opposite end portion of the substrate layer 100.

For example, end portions of the traces 180 and 185 may be assembled on the touch sensor bonding region to be electrically connected to the touch sensor driving IC chip 190. For convenience of descriptions, detailed extension and connection structures of the traces 180 and 185 are omitted in FIG. 1.

One end of the substrate layer 100 may serve as an antenna bonding region ABR (see FIG. 5). An antenna driving IC chip 195 and the antenna unit 50 may be electrically connected through the antenna bonding region.

In some embodiments, flexible printed circuit board (FPCB)s may each be disposed between the antenna driving IC chip 195 and the antenna unit 50 and between the touch sensor driving IC chip 190 and the end portions of the traces 180 and 185. For example, the antenna driving IC chip 195 may be directly mounted on the flexible printed circuit board.

In an embodiment, an additional intermediate circuit board (e.g., a rigid printed circuit board) may be further disposed between the flexible printed circuit board and the antenna driving IC chip 195.

Figure 4:
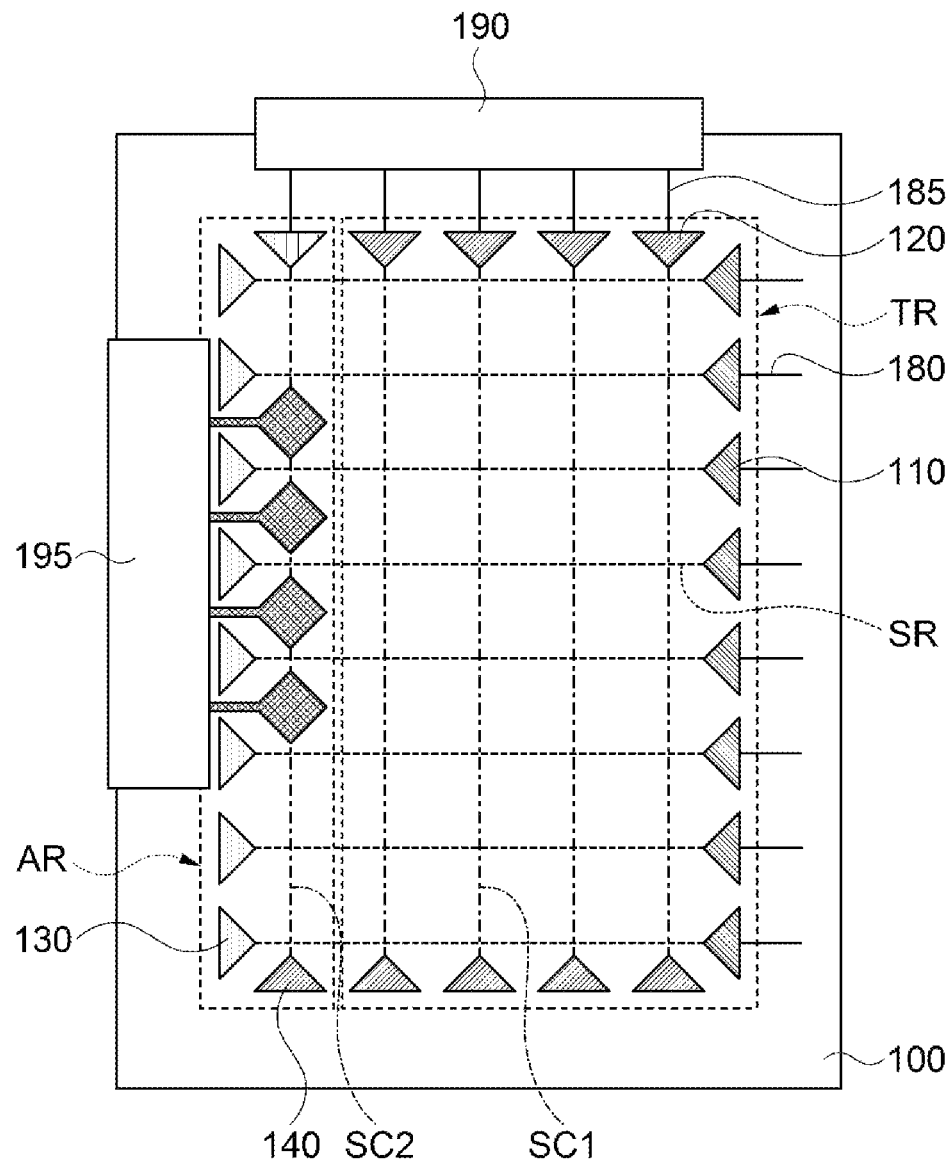
FIG. 4 is a schematic top planar view illustrating an antenna-inserted electrode structure in accordance with some exemplary embodiments.

FIG. 4 is a schematic top planar view illustrating an antenna-inserted electrode structure in accordance with some exemplary embodiments. Detailed descriptions of elements and structures substantially the same as or similar to those described with reference to FIGS. 1 to 3 are omitted herein.

Referring to FIG. 4, the antenna-touch sensing region AR may be disposed to be adjacent to a lateral portion of the touch sensing region TR.

In this case, the antenna unit 50 may overlap at least one sensing electrode column among the sensing electrode columns defined by connecting the column sensing electrodes 130 and 140 in the column direction as described above.

For example, first sensing electrode columns SC1 may be disposed in the touch sensing region TR, and a second sensing electrode column SC2 may be disposed in the antenna-touch sensing region AR. The antenna unit 50 may be disposed in the antenna-touch sensing region AR together with the second sensing electrode column SC2.

As described above, the antenna unit 50, the second row sensing electrodes 130, and the second column sensing electrodes 140 disposed in the antenna-touch sensing region AR may include a low resistance conductive material different from a conductive material included in the first row sensing electrodes 110 and the first column sensing electrodes 120.

In some embodiments, the antenna-touch sensing region AR may be disposed to be adjacent to both lateral portions of the touch sensing region TR.

FIG. 5 is a partially enlarged top planar view illustrating arrangements of electrodes and patterns in an antenna-inserted electrode structure in accordance with some exemplary embodiments Referring to FIG. 5, as described above, the antenna unit 50, the second row sensing electrodes 130 and the second column sensing electrodes 140 may be arranged together on the antenna-touch sensing region AR of the substrate layer 100.

The antenna unit 50 may include a radiator 52 and a transmission line 54. The radiator 52 may have, e.g., a polygonal pattern shape such as a rhombus shape. The transmission line 54 may extend from one end of the radiator 52. In some embodiments, the radiator 52 and the transmission line 54 may be a substantially single member connected integrally to each other.

A signal pad 56 may be connected to an end portion of the transmission line 54. A ground pad 58 may be disposed around the signal pad 56. For example, a pair of the ground pads 58 may be disposed to face each other with the signal pad 56 interposed therebetween. The ground pad 58 may be electrically and physically separated from the transmission line 54 and the signal pad 56.

The signal pad 56 and the ground pad 58 may be disposed in an antenna bonding region ABR allocated to one end portion of the substrate layer 100 adjacent to the antenna-touch sensing region AR. As described above, the signal pad 56 and the antenna driving IC chip 195 may be electrically connected to each other on the antenna bonding region ABR through, e.g., the flexible printed circuit board.

In some embodiments, the radiator 52 and the transmission line 54 may include a mesh structure including the aforementioned low-resistance metal or alloy. The signal pad 56 and the ground pad 58 may be a solid pattern including the low-resistance metal or alloy as described above for reducing a circuit connection resistance.

In some embodiments, an intermediate electrode 133 for connecting the second row sensing electrodes 130 may be formed on the antenna-touch sensing region AR. The intermediate electrode 133 may be formed around the antenna unit 50 along, e.g., a periphery of the radiator 52. The intermediate electrode 133 may be electrically connected to the adjacent second row sensing electrodes 130 via the second bridge electrode 135.

Accordingly, even when the second sensing electrode row SR2 overlaps the antenna unit 50 in the row direction, an electrical continuity of the sensing electrode row may be maintained on the antenna-touch sensing region AR through the intermediate electrode 133.

In some embodiments, the second column sensing electrodes 140 may be connected to each other through the second connector 145 in the antenna-touch sensing region AR. In an embodiment, the second column sensing electrodes 140 may maintain a connectivity or continuity with the sensing electrode column SC in the touch sensing region TR through the second connector 145.

For example, the second connector 145 and the intermediate electrode 133 may have bent shapes along the periphery of the radiator 52.

In some embodiments, as illustrated in FIG. 5, the sensing electrodes 110 and 120 disposed on the touch sensing region TR may have a larger area than those of the sensing electrodes 130 and 140 on the antenna-touch sensing region AR.

The area of the sensing electrodes 110 and 120 may be increased in the touch sensing region TR so that convenience of a patterning process may be enhanced and a resistance of a sensing channel may be lowered even though the relatively high-resistance conductive material is used.

For convenience of descriptions, the sensing electrodes 110, 120, 130 and 140 are illustrated as having a rhombus shape in FIG. 5, but boundaries of the sensing electrodes 110, 120, 130 and 140 may have wavy shapes.

Figure 6:
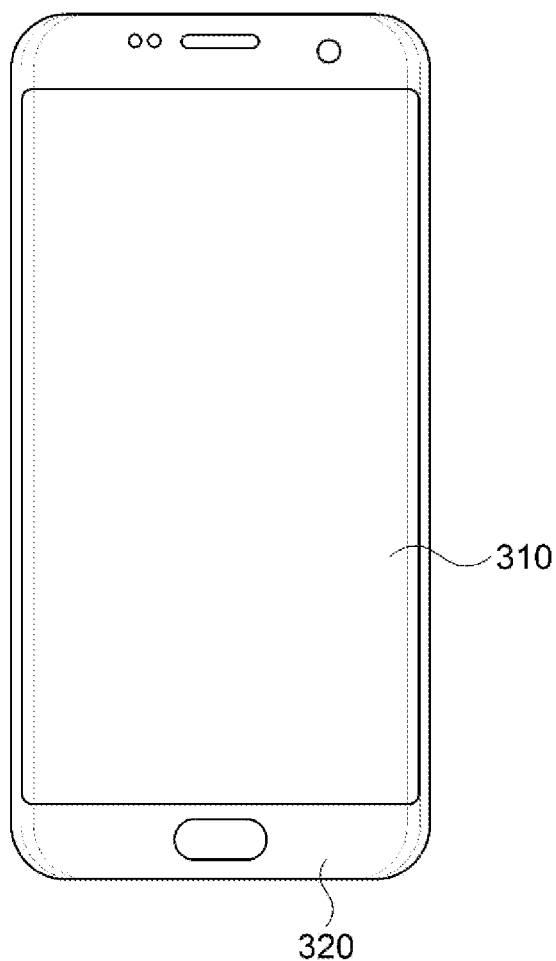
FIG. 6 is a schematic top planar view illustrating an image display device in accordance with exemplary embodiments.

FIG. 6 is a schematic top planar view illustrating an image display device in accordance with exemplary embodiments. For example, FIG. 6 illustrates an outer shape including a window of the image display device.

Referring to FIG. 6, an image display device 300 may include a display area 310 and a peripheral area 320. The peripheral area 320 may be disposed at both lateral and/or end portions of the display area 310. The peripheral area 320 may correspond to, e.g., a light-shielding portion or a bezel portion of the image display device.

The touch sensing region TR and the antenna-touch sensing region AR of the antenna-inserted electrode structure as described with reference to FIG. 1 may be included in the display region 310. Accordingly, the sensing electrodes 110, 120, 130 and 140 and the radiator 52 may be arranged in the display area 310. As described above, the first row sensing electrodes 110 and the first column sensing electrodes 120 included in the touch sensing region TR may include the transparent conductive oxide, so that transmittance in the display area 310 may be improved.

In an embodiment, the radiator 52, the second row sensing electrodes 130 and the second column sensing electrodes 140 included in the antenna-touch sensing region AR may be formed of the mesh structure including the low-resistance metal or alloy to be prevented from being visually recognized to a user.

The antenna bonding region ABR of the antenna-inserted electrode structure may be included in the peripheral area 320. Accordingly, electrical connection with the antenna driving IC chip 195 in the peripheral area 320 via the signal pad 56 may be implemented.

Further, terminal end portions of the traces 180 and 185 may be electrically connected to the touch sensor driving IC chip 195 in the peripheral area 320.

What is claimed is:

1. An antenna-inserted electrode structure, comprising:
a substrate layer having a touch sensing region and an antenna-touch sensing region;
first sensing electrodes arranged on the touch sensing region of the substrate layer;
second sensing electrodes arranged on the antenna-touch sensing region of the substrate layer and including second row sensing electrodes and second column sensing electrodes;
an antenna unit spaced apart from the second sensing electrodes on the antenna-touch sensing region of the substrate layer, the antenna unit including a radiator;
an intermediate electrode disposed around the antenna unit on the antenna-touch sensing region to electrically connect second row sensing electrodes neighboring in a row direction of the second row sensing electrodes; and
a second connector disposed around the antenna unit on the antenna-touch sensing region to connect second column sensing electrodes neighboring in a column direction of the second column sensing electrodes, wherein the antenna unit and the second sensing electrodes include a conductive material having a resistance lower than a resistance of the first sensing electrodes, wherein the second sensing electrodes and the antenna unit are located at the same level on the substrate layer, the second sensing electrodes and the antenna unit do not overlap in a planar view, and the antenna unit is disposed between the second sensing electrodes, wherein the second connector and the intermediate electrode have bent shape along the periphery of the radiator.

2. The antenna-inserted electrode structure of claim 1, wherein the first sensing electrodes include a transparent conductive oxide.

3. The antenna-inserted electrode structure of claim 2, wherein the second sensing electrodes and the antenna unit have a mesh structure formed of a metal or an alloy.

4. The antenna-inserted electrode structure of claim 3, further comprising a dummy mesh electrode disposed between the second sensing electrodes and the antenna unit to be separated from the second sensing electrodes and the antenna unit.

5. The antenna-inserted electrode structure of claim 2, wherein the second sensing electrodes and the antenna unit include a metal nanowire or a conductive polymer.

6. The antenna-inserted electrode structure of claim 2, wherein the second sensing electrodes and the antenna unit have a multi-layered structure of a transparent conductive oxide layer and a metal layer.

7. The antenna-inserted electrode structure of claim 1, wherein the first sensing electrodes include first row sensing electrodes and first column sensing electrodes.

8. The antenna-inserted electrode structure of claim 7, further comprising:

a first bridge electrode electrically connecting first row sensing electrodes neighboring in a row direction of the first row sensing electrodes on the touch sensing region; and a first connector connecting first column sensing electrodes neighboring in a column direction of the first column sensing electrodes on the touch sensing region.

9. The antenna-inserted electrode structure of claim 1, further comprising a second bridge electrode connecting the intermediate electrode and the second row sensing electrodes neighboring in the row direction on the antenna-touch sensing region, wherein the intermediate electrode is disposed to be separated from the second row sensing electrodes.

10. The antenna-inserted electrode structure of claim 1, wherein the second connector has a shape different from that of a first connector.

11. The antenna-inserted electrode structure of claim 7, wherein the first row sensing electrodes are connected to each other in a row direction to form first sensing electrode rows spaced apart from each other along a column direction on the touch sensing region, and the second row sensing electrodes are connected to each other in the row direction to form a second sensing electrode row on the antenna-touch sensing region.

12. The antenna-inserted electrode structure of claim 11, wherein the antenna unit overlaps the second sensing electrode row in the row direction on the same plane.

13. The antenna-inserted electrode structure of claim 11, wherein the first column sensing electrodes are connected to each other in the column direction to form first sensing electrode columns spaced apart from each other along the row direction on the touch sensing region, and the second column sensing electrodes are connected to the first sensing electrode columns.

14. The antenna-inserted electrode structure of claim 1, wherein the antenna unit and the second sensing electrodes include the same conductive material.

15. An image display device comprising the antenna-inserted electrode structure of claim 1.

* * * * *